UNITED STATES PATENT OFFICE.

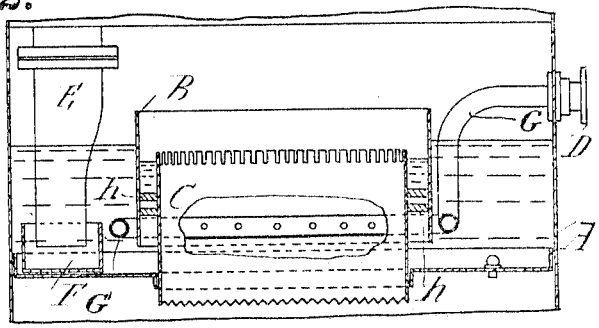
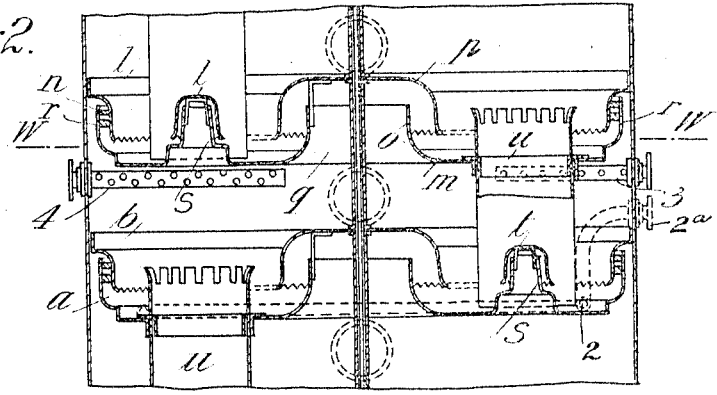
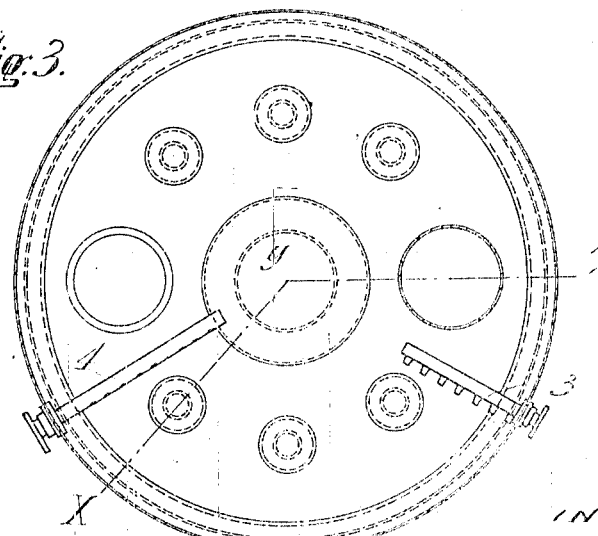

FRANZ PAMPE, OF HALLE-ON-THE-SAALE, GERMANY; ELEONORE JOSEFINE JOHANNA PAMPE, WIDOW, ONE-FOURTH INTEREST, PHIL-BRUNO OTTO ALEXANDER PAMPE, SON, THREE-EIGHTHS INTEREST, AND OTTO ALFRED ROBERT PAMPE, SON, THREE-EIGHTHS INTEREST OF THE ESTATE OF SAID FRANZ PAMPE, DECEASED.

APPARATUS FOR THE ELIMINATION OF FUSEL-OILS DURING THE DISTILLATION AND RECTIFICATION OF ALCOHOL.

1,116,322.  Specification of Letters Patent.  Patented Nov. 3, 1914.

Application filed August 8, 1905. Serial No. 273,292.

*To all whom it may concern:*

Be it known that I, FRANZ PAMPE, a subject of the King of Prussia, German Emperor, residing at the city of Halle-on-the-Saale, in the Kingdom of Prussia, German Empire, have invented certain new and useful Improvements in Apparatus for the Elimination of the Fusel-Oils During the Distillation and Rectification of Alcohol; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to an apparatus for the perfect elimination of all the fusel oils, during the distillation and rectification of alcohol, the said new apparatus being located on the distilling and rectifying columns.

The purpose of the new apparatus is to completely remove the fusel oils from the mixture of alcohol and water contained in the column, in such a manner that the vapors passing through the column will no longer be compelled to traverse sections impregnated with fusel oil; in this way a marked improvement in the quality of the product is secured.

A process for the removal of the fusel oils from the column is already in existence; see application Serial No. 256,277, filed by me on April 18, 1905. In this process the fusel oils are withdrawn from the column at a predetermined point thereof, namely, at that spot where they collect, by the aid of steam which is admitted at one side and allowed to escape at the other. The aforesaid predetermined point of the column is located at that part thereof where the fusel oils ascending in the column, in the shape of vapor, have not yet been dissolved by the also ascending alcoholic vapors; whereas, in the section lying immediately above, a dissolution of the fusel oil vapors takes place due to the alcoholic vapors. In most cases the point in question lies in the fifth compartment of the column, counting from the bottom with an ordinary 9 meter column divided into about forty compartments, and with plates or floors about 0.2 to 0.3 meter apart. In the lowest part of the column there is a mixture consisting of alcohol, water and fusel oils; these latter remain undissolved owing to the small percentage of alcohol contained in the mixture. If this lower part be heated, then the fusel oil and alcohol vapors, combined with the steam, will arise in the column and pass from one compartment to the other. These vapors, during their passage through the compartments, become enriched with alcohol, and ultimately a compartment will be found wherein the alcohol and water vapors have become so rich in alcohol that they are now capable of dissolving the fusel oils. In the immediate vicinity of this division or compartment there is located the aforesaid point of the column, at which steam is introduced into the column, and this steam, which is admitted at one side of the column and allowed to escape at the other, carries the molecules of fusel oil away with it. At this aforesaid point, hereinafter called the "dividing layer", a pipe with nozzles is inserted in the column, while a perforated pipe is mounted on the other side. The pipe with the nozzles is for introducing the steam into the column, whereas the other or perforated pipe takes up the mixture of steam and fusel oils and carries it away out of the column. The steam passes into the column through the nozzles and moves toward the holes in the perforated pipe, by which it is taken up. This perforated pipe has its holes on that side which faces toward the other pipe and the jets of steam, emerging from the nozzles, make their way toward the perforated surface of the other pipe. While passing from the nozzles to the perforated surface in question, the steam extracts all the fusel oil vapors. In this way it becomes possible to remove the fusel oils from the column almost entirely, and thus facilitate the obtention of a perfectly fine product, the very point for which my new apparatus is essentially intended. The pipes just described are located in the upper part of the particular compartment in question above the level of liquid which collects in the bottom of the compartment. Means are also best provided for introducing steam below the liquid in the compartment.

My invention consists in the application of a steam inlet pipe to one side of the column, and of a steam exhaust pipe to the other side thereof, this being done at the dividing layer, i. e. in the compartment of the column where the molecules of fusel oil are still undissolved, and beneath that compartment in which they are dissolved by the alcoholic mixture. The hereinbefore mentioned pipes project into the compartment at the dividing layer, and above the liquid level in said compartment, a perforated pipe or the like being also provided for introducing steam below the layer of liquid in the compartment.

In the accompanying drawing I have shown more or less diagrammatically a typical embodiment of apparatus elements suitable for the use in carrying out the present process.

In these drawings Figure 1 is a vertical section through a part of the apparatus showing a trap device located at the base of the distilling column and immediately above the boiling chamber: Fig. 2 is a vertical section through a higher compartment on the line X Y Z of Fig. 3; and Fig. 3 is a horizontal section on the line W W of Fig. 2.

In Fig. 1, A represents a portion of the column situated at a lower level than the so-called dividing layer. In this portion of the column, which in this instance is at the base of the column and immediately above the boiling chamber, is located a cylindrical sleeve C of comparatively large diameter, having its upper and lower edges slotted or serrated. This sleeve opens downwardly directly into the boiling chamber. Surrounding C and suitably spaced away therefrom by members $h$ of a supporting spider or the like, is another cylindrical sleeve B which projects above the upper edge of C and extends nearly to the bottom of the compartment, there being communication however between the main part of the compartment and the annular space inclosed between the two cylinders. Alcoholic liquid flows down through an overflow pipe E from higher portions of the column and enters vessel F, rising upwardly therefrom and partly filling the compartment A. The strength of the alcoholic liquid is such that separation of fusel oil takes place as a supernatant blanketing layer which, however, is prevented by baffle B from access to the annular space immediately surrounding C. The heavier alcoholic liquid flows under the lower edge of B, thence upwardly between B and C, thence over the edge of C and down along the walls thereof into the still below. The dimensions of C are such that the upward flow of vapors from the still is not interfered with by the downwardly flowing liquid.

D is a connection for admitting steam to pipe G which terminates in a circular perforated coil surrounding B and located below the liquid level. Steam fed into the compartment through this perforated pipe streams through the liquid, rises to the surface of the same and takes up fusel oils which it carries with other vapors into the higher compartment of the column, arriving eventually at the compartment located immediately below the point where solution of the fusel oils occurs.

Fig. 2 illustrates a chamber of the distilling column substantially at the locality of the dividing layer hereinbefore described, and just below the portion of the column where solution of the fusel oils takes place. Annular member $l$ is connected with and supports the bottom $m$ by means of members $n$. In the center of this bottom is an upwardly extending conduit or neck $o$ above which is supported an inverted bell $p$ having serrated lower edges located a short distance above the bottom $m$. Alcoholic vapors rising upwardly through the opening $q$ in the neck $o$ are deflected downwardly by the bell and pass under the edges thereof through liquid which may collect on the bottom $m$ to a depth fixed by the height of the upper edges of downflow pipe $u$ which extends through the bottom to a point slightly above the bottom of the compartment or tray $a$. Alcoholic vapors may also pass upwardly through the space between the sides of the column and the upturned periphery of bottom or tray $m$, thence downwardly through spaces $r$ between the said upturned periphery and ring $l$, finally passing under the serrated lower edges of the ring through the liquid and thence into the vapor space thereabove.

Members $a$ and $b$ correspond respectively to $m$ and $p$ and the passage of vapors from the under side of $a$ upwardly into the compartment included between $a$ and $m$ takes place in exactly the same manner as has just been described.

In some cases it is also convenient to provide small necks or conduits $s$ having bells $t$, to effect more perfect distribution of steam and other vapors.

Liquid is conducted from one compartment to the next lower through the overflow pipes $u$.

In the lower part of the compartment illustrated in Fig. 2, and immediately above the bottom $a$ is located a circular perforated steam pipe 2 to which steam may be supplied from any suitable source through coupling $2^a$. In the upper part of the compartment, above the liquid level and best immediately below floor or tray $m$ is located a steam inlet pipe 3 provided with jet nozzles and arranged to discharge steam horizontally into the compartment and substantially tangentially to the walls thereof. This pipe projects into the compartment radially. Spaced away from the pipe 3 at a suitable distance is a perforated pipe 4 which also projects radially into the compartment and which serves as means for withdrawing mixed vapors of steam and fusel oils from the compartment.

The method of operating the portion of the apparatus so far described is as follows: The alcoholic liquor to be distilled is placed in the still which may be heated by means of steam introduced directly into the liquid. The alcoholic vapors pass upwardly through the still column through the superposed compartments, the liquid in the bottom of each compartment being stronger and stronger from the lowest to the highest compartment. At the locality in the column illustrated in Fig. 2, the alcoholic liquid on the compartment bottom is still too weak to dissolve the fusel oils, these latter floating on the top of the liquid layer. In the compartment next above, the alcohol is strong enough to dissolve at least substantial portions of the fusel oils. Steam is introduced through perforated pipe 2 into the liquid collected on bottom $a$, passes through the liquid and carries with it into the vapor space above the liquid, vapors of fusel oils mixed with more or less alcohol. Steam is introduced in horizontal and tangential jets from pipe 3, giving a whirling motion in a substantially horizontal plane to the vapors, and thus continually presenting fresh portions of the vapor to the withdrawal pipe 4, through which the mixed vapors are withdrawn and conveyed to some convenient place outside the column.

Having now described the nature of my invention and the manner in which the same is to be performed, I declare that what I claim and desire to protect by Letters Patent is:

1. In a distilling and rectifying apparatus for the production of alcohol, the combination of a column, having several floors which divide the column into compartments, the said floors having inlets therein for the vapors ascending in the column, and inlets for the alcoholic liquid trickling down from compartment to compartment, a pipe for admitting steam into the column, and a perforated pipe projecting into the column for carrying off the steam and fusel oils out of the column, both pipes being above the level of the liquid in that compartment of the column in which the fusel oils are still undissolved, said compartment being next to that in which the fusel oils are dissolved by means of the alcohol mixture.

2. In a distilling and rectifying apparatus for the production of alcohol, the combination of a column having several floors which divide the column into compartments, said floors having inlets therein for the vapors ascending in the column, and further inlets for the alcoholic liquid trickling down from compartment to compartment, a pipe provided with nozzles for injecting steam into one of said compartments, and a perforated pipe projecting into the column for taking up and discharging the steam saturated with the fusel oils, both pipes being above the level of the liquid in that compartment of the column in which the fusel oils are still undissolved, said compartment being next to that in which the fusel oils are dissolved by means of the alcohol mixture.

3. Apparatus for separating the first and last runnings in the distillation and rectification of alcoholic liquids, comprising, in combination with a suitable distilling column having a plurality of superposed compartments, means for introducing steam into one of said compartments, said compartment being located below where the fusel oils become dissolved in the alcoholic mixture, and means arranged in the vapor space of said compartment and projecting through the column wall for removing mixed vapors therefrom.

4. Apparatus for separating the first and last runnings in the distillation and rectification of alcoholic liquids, comprising, in combination with a suitable distilling column having a plurality of superposed compartments, means for introducing steam into one of said compartments below the level of liquid contained therein, said compartment being located below where the fusel oils become dissolved in the alcoholic mixture, and means arranged in the vapor space of said compartment and projecting through the column wall for removing mixed vapors therefrom.

5. Apparatus for separating the first and last runnings in the distillation and rectification of alcoholic liquids, comprising, in combination with a suitable distilling column having a plurality of superposed compartments, means for introducing steam into one of said compartments below the liquid level therein, means for introducing steam into the vapor space above the liquid level in said compartment to produce a whirling movement of vapors in said space, and means for withdrawing vapors from said space through the wall of the column, said compartment being located slightly below that portion of the column where the fusel oils become dissolved in the alcoholic mixture.

6. Apparatus for separating the first and last runnings in the distillation and rectification of alcoholic liquids, comprising, in combination with a suitable distilling column having a plurality of superposed communicating compartments arranged above a boiling chamber, a relatively wide cylindrical conduit open at both ends extending from a suitable elevation above the bottom of the lowest compartment through said bottom into the boiling chamber, a suitably supported cylindrical baffle concentric with said conduit and spaced away therefrom, said baffle extending from a point somewhat above said compartment bottom to a point higher than said conduit, whereby the return of fusel oils into said boiling chamber is prevented, means for introducing steam below the liquid level in said compartment, means for introducing steam substantially horizontally into the vapor space of a higher compartment of the column to produce whirling of mixed vapors therein, and means for withdrawing such mixed vapors from said vapor space through the column wall.

7. In combination with a column still comprising a boiling chamber and a plurality of superposed communicating chambers arranged thereabove, a trap for preventing return of fusel oils from the still column to the boiling chamber, comprising a relatively wide cylindrical conduit open at both ends extending from a suitable elevation above the bottom of the lowest compartment through said bottom into the boiling chamber, and a suitably supported cylindrical baffle concentric with said conduit and spaced away therefrom, said baffle extending from a point somewhat above the bottom of said compartment to a point higher than said conduit.

In testimony that I claim the foregoing as my invention, I have signed my name in presence of two subscribing witnesses.

FRANZ PAMPE.

Witnesses:
 RUDOLPH FRICKE,
 S. P. WARNER.